United States Patent
Bai et al.

(10) Patent No.: US 11,812,454 B2
(45) Date of Patent: Nov. 7, 2023

(54) SLOT AGGREGATION IN SINGLE FREQUENCY NETWORK

(71) Applicant: QUALCOMM Incorporated, San Diego, CA (US)

(72) Inventors: Tianyang Bai, Somerville, NJ (US); Wooseok Nam, San Diego, CA (US); Kiran Venugopal, Raritan, NJ (US); Sungwoo Park, Seoul (KR); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/320,092

(22) Filed: May 13, 2021

(65) Prior Publication Data

US 2021/0410146 A1 Dec. 30, 2021

Related U.S. Application Data

(60) Provisional application No. 63/044,694, filed on Jun. 26, 2020.

(51) Int. Cl.
*H04W 72/53* (2023.01)
*H04W 72/0446* (2023.01)
(Continued)

(52) U.S. Cl.
CPC ......... *H04W 72/53* (2023.01); *H04W 72/046* (2013.01); *H04W 72/0446* (2013.01); *H04W 72/23* (2023.01)

(58) Field of Classification Search
CPC . H04W 72/53; H04W 72/23; H04W 72/0446; H04W 72/046
See application file for complete search history.

(56) References Cited

U.S. PATENT DOCUMENTS

2014/0119266 A1* 5/2014 Ng ...................... H04L 27/2602 370/312
2014/0365848 A1* 12/2014 Roh ...................... H04L 1/0041 714/784

(Continued)

OTHER PUBLICATIONS

Apple Inc: "Remaining Issues for Multi-TRP Enhancement", 3GPP Draft, 3GPP TSG RAN WG1 #100b, R1-2002337, 3rd Generation Partnership Project (3GPP), Mobile Competence Centre, France, vol. RAN WG1. No. e-Meeting, Apr. 20, 2020-Apr. 30, 2020 Apr. 11, 2020 (Apr. 11, 2020), XP051875556, 17 Pages, Retrieved from Internet: URL: https://itp.3gpp.org/tsg_ran/WG1_RL1/TSGR1_100b_e/Docs/R1-2002337.zip R1-2002337 Remaining-Issues for MultiTRP Enhancemnt.docx [retrieved on Apr. 11, 2020] Section 2.

(Continued)

*Primary Examiner* — Jael M Ulysse
(74) *Attorney, Agent, or Firm* — Procopio, Cory, Hargreaves & Savitch LLP

(57) ABSTRACT

A user equipment (UE) receives a configuration from a base station for receiving multiple repetitions of a transmission in a slot aggregation. The UE receives an indication indicating one or more beams used for the multiple repetitions of the transmission. The UE receives a first repetition of the transmission in a first slot based on single frequency network (SFN) operation using at least one configuration that is different from a configuration used for receiving a second repetition in a second slot based on non-SFN operation. The UE optionally determines, based on the indication, whether repetitions within the multiple repetitions of the transmission are transmitted by the base station based on the SFN operation or the non-SFN operation.

30 Claims, 11 Drawing Sheets

(51) Int. Cl.
*H04W 72/044* (2023.01)
*H04W 72/23* (2023.01)

(56) References Cited

U.S. PATENT DOCUMENTS

| | | | |
|---|---|---|---|
| 2017/0127392 A1* | 5/2017 | Aiba | H04L 1/0072 |
| 2019/0334689 A1* | 10/2019 | Kwak | H04W 72/0446 |
| 2019/0373486 A1 | 12/2019 | Bai et al. | |
| 2020/0053757 A1* | 2/2020 | Bagheri | H04L 5/0058 |
| 2020/0313796 A1* | 10/2020 | Park | H04L 1/0027 |
| 2022/0070901 A1* | 3/2022 | Muruganathan | H04L 5/0094 |
| 2022/0095304 A1* | 3/2022 | Muruganathan | H04B 7/024 |
| 2022/0124768 A1* | 4/2022 | Frenne | H04L 5/0044 |
| 2022/0131645 A1* | 4/2022 | Miao | H04L 1/08 |
| 2022/0173850 A1* | 6/2022 | Xu | H04W 36/08 |
| 2023/0022915 A1* | 1/2023 | Bhamri | H04B 7/0408 |
| 2023/0096196 A1* | 3/2023 | Kim | H04L 5/0053 370/329 |

OTHER PUBLICATIONS

Huawei, et al., "Summary of Enhancements on Multi-TRP/Panel Transmission", 3GPP Draft, 3GPP TSG RAN WG1 Meeting #98, R1-1909602 FLSUMMARY_MTRP_V3, 3rd Generation Partnership Project (3GPP), Mobile Competence Centre, France, vol. RAN WG1, No. Prague, Czech Republic, Aug. 26, 2019-Aug. 30, 2019, Sep. 3, 2019 (Sep. 3, 2019), Aug. 30, 2019 (Aug. 30, 2019), XP051766198, 76 Pages, Retrieved from the Internet: URL: http://www.3gpp.org/ftp/tsg_ran/WG1_RL1/TSGR1_98/Docs/R1-1909602.zip [retrieved on Sep. 3, 2019] pp. 1-3, 38, Sections 2-4.
International Search Report and Written Opinion—PCT/US2021/032639—ISA/EPO—dated Jul. 26, 2021.
LG Electronics: "Enhancements on Multi-TRP/Panel Transmission", 3GPP Draft, 3GPP TSG RAN WG1 Meeting #97, R1-1906730_MTRP, 3rd Generation Partnership Project (3GPP), Mobile Competence Centre, 650, Route Des ucioles, F-06921 Sophia-Antipolis Cedex, France, vol. RAN WG1, No. Reno, USA, May 13, 2019-May 17, 2019 May 13, 2019 (May 13, 2019), XP051728181, pp. 1-11, Retrieved from the Internet: URL: http://www.3gpp.org/ftp/Meetings%5F3GPP%5FSYNC/RAN1/Docs/R1%2D1906730%2Ezip [retrieved on May 13, 2019] Section 2.3.

* cited by examiner

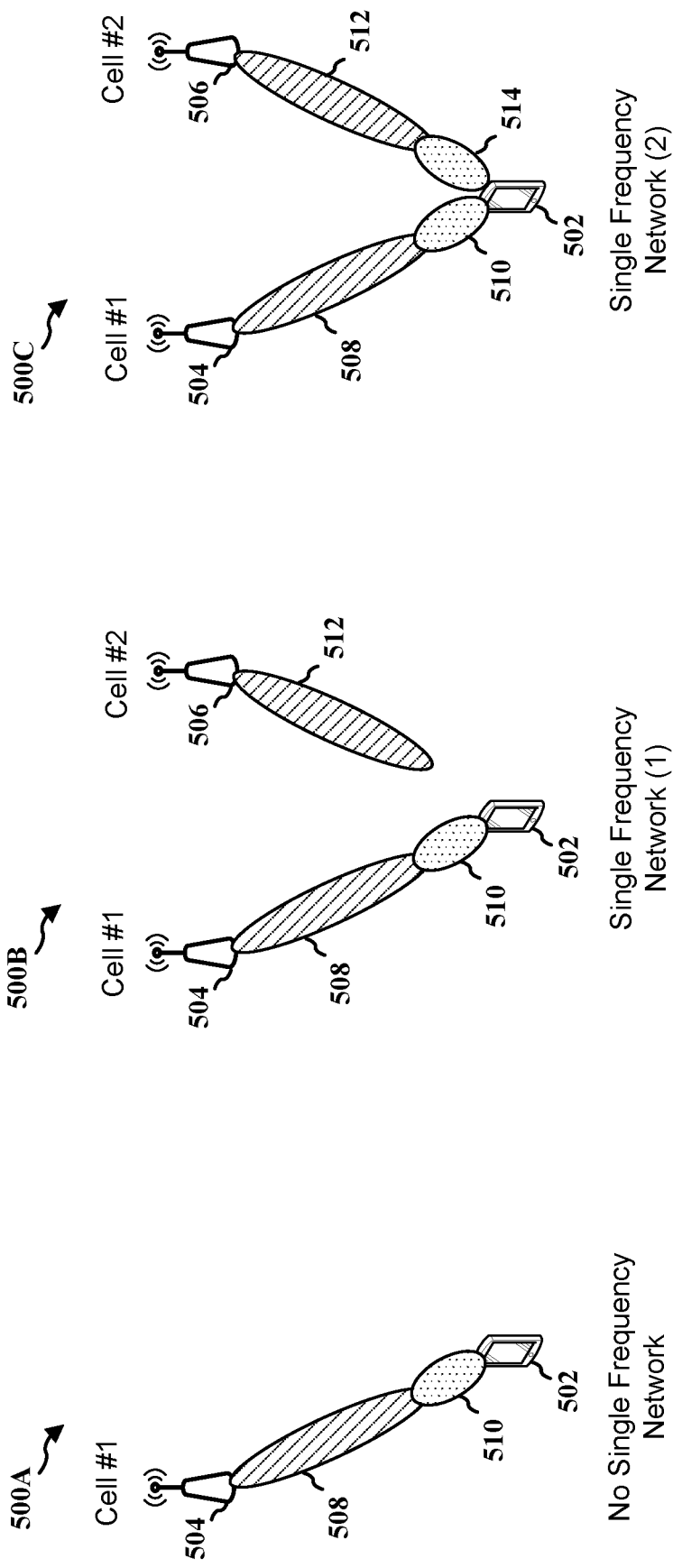

SLOT AGGREGATION IN SINGLE FREQUENCY NETWORK

CROSS REFERENCE TO RELATED APPLICATION(S)

This application claims the benefit of U.S. Provisional Application Ser. No. 63/044,694, entitled "SLOT AGGREGATION IN SINGLE FREQUENCY NETWORK" and filed on Jun. 26, 2020, which is expressly incorporated by reference herein in its entirety.

TECHNICAL FIELD

The present disclosure relates generally to communication systems, and more particularly, to wireless communication involving slot aggregation and a single frequency network (SFN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus configures a user equipment (UE) to receive multiple repetitions of a transmission using a slot aggregation. The apparatus indicates to the UE one or more beams used for each repetition of the transmission. The apparatus transmits the multiple repetitions of the transmission based on the one or more beams indicated to the UE, where at least one of the multiple repetitions of the transmission is transmitted based on single frequency network (SFN) operation using more than one beams.

In an aspect of the disclosure, a method, a computer-readable medium, and an apparatus are provided for wireless communication at a UE. The apparatus receives a configuration from a base station for receiving multiple repetitions of a transmission in a slot aggregation. The apparatus receives an indication indicating one or more beams used for the multiple repetitions of the transmission. The apparatus receives a first repetition of the transmission in a first slot based on SFN operation using at least one configuration that is different from a configuration used for receiving a second repetition in a second slot based on non-SFN operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A, 5B, and 5C are diagrams illustrating examples of beamforming under the SFN and the non-SFN in accordance with various aspects of the present disclosure.

DETAILED DESCRIPTION

Figure 1:
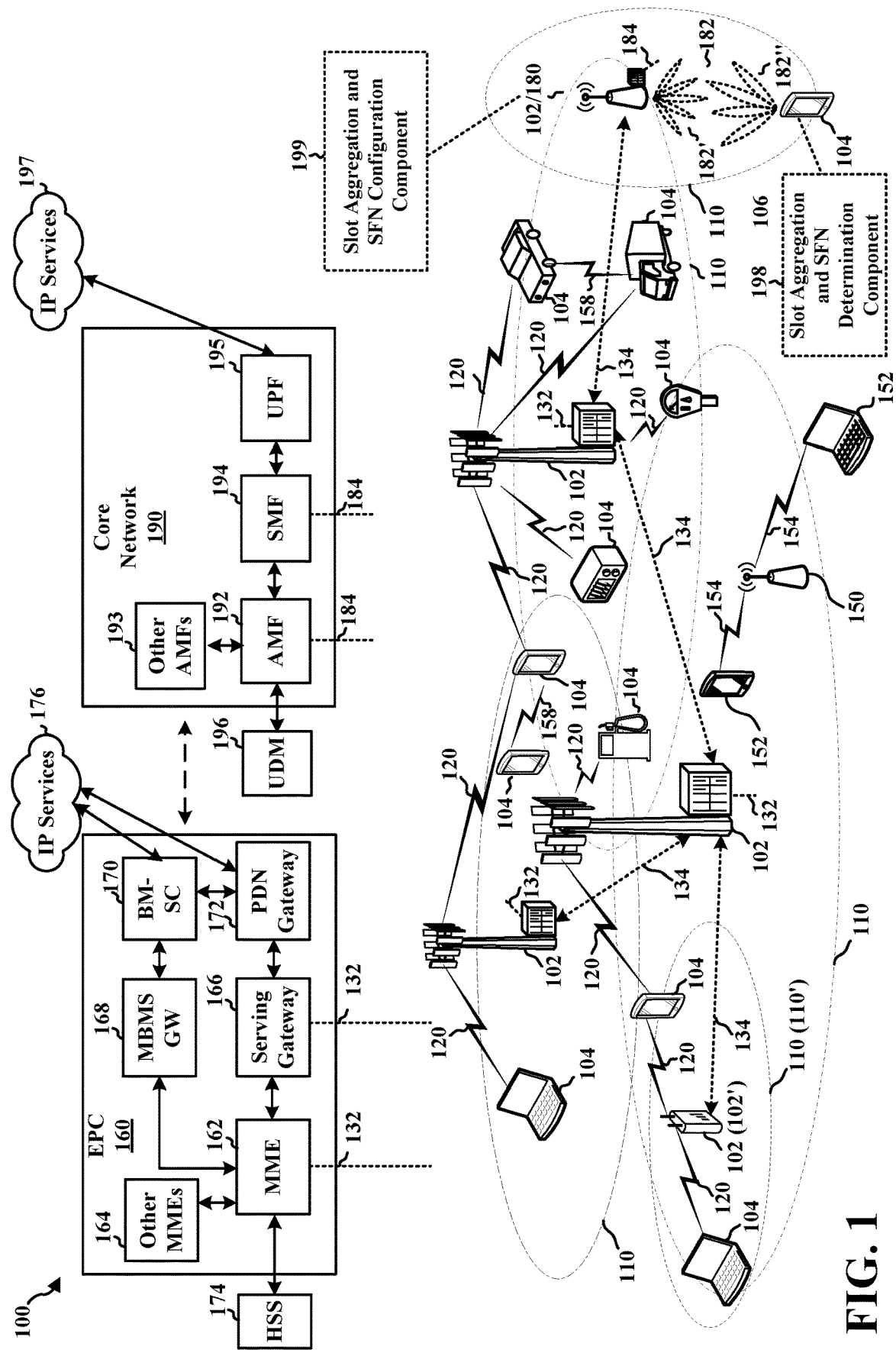
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100. In certain aspects, the base station 102/180 may include a slot aggregation and SFN configuration component 199 configured to configure slot aggregation for a transmission and transmit some of the slots within the slot aggregation under the SFN. For example, the slot aggregation and SFN configuration component 199 may configure a slot to be transmitted with multiple repetitions, where some of the repetitions may be transmitted using SFN slots and some of the repetitions may be transmitted using non-SFN slots. In one configuration, the slot aggregation and SFN configuration component 199 may be configured to configure a UE to receive multiple repetitions of a transmission using a slot aggregation. In such a configuration, the slot aggregation and SFN configuration component 199 may be configured to indicate to the UE one or more beams used for each repetition of the transmission. In such a configuration, the slot aggregation and SFN configuration component 199 may be configured to transmit the multiple repetitions of the transmission based on the one or more beams indicated to the UE, wherein at least one of the multiple repetitions of the transmission is transmitted based on SFN operation using more than one beams.

In certain aspects, the UE 104 may include a slot aggregation and SFN determination component 198 configured to receive slots that are transmitted under the SFN mode and slots transmitted under the non-SFN mode. The slot aggregation and SFN determination component 198 may further determine whether a slot is transmitted under the SFN mode, and may configure one or more different beam for receiving the SFN slots. In one configuration, the slot aggregation and SFN determination component 198 may be configured to receive a configuration from a base station for receiving multiple repetitions of a transmission in a slot aggregation. In such a configuration, the slot aggregation and SFN determination component 198 may be configured to receive an indication indicating one or more beams used for the multiple repetitions of the transmission. In such a configuration, the slot aggregation and SFN determination component 198 may be configured to receive a first repetition of the transmission in a first slot based on SFN operation using at least one configuration that is different from a configuration used for receiving a second repetition in a second slot based on non-SFN operation.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a mmW band in documents and articles, despite being different from the EHF band which is identified by the International Telecommunications Union (ITU) as a mmW band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
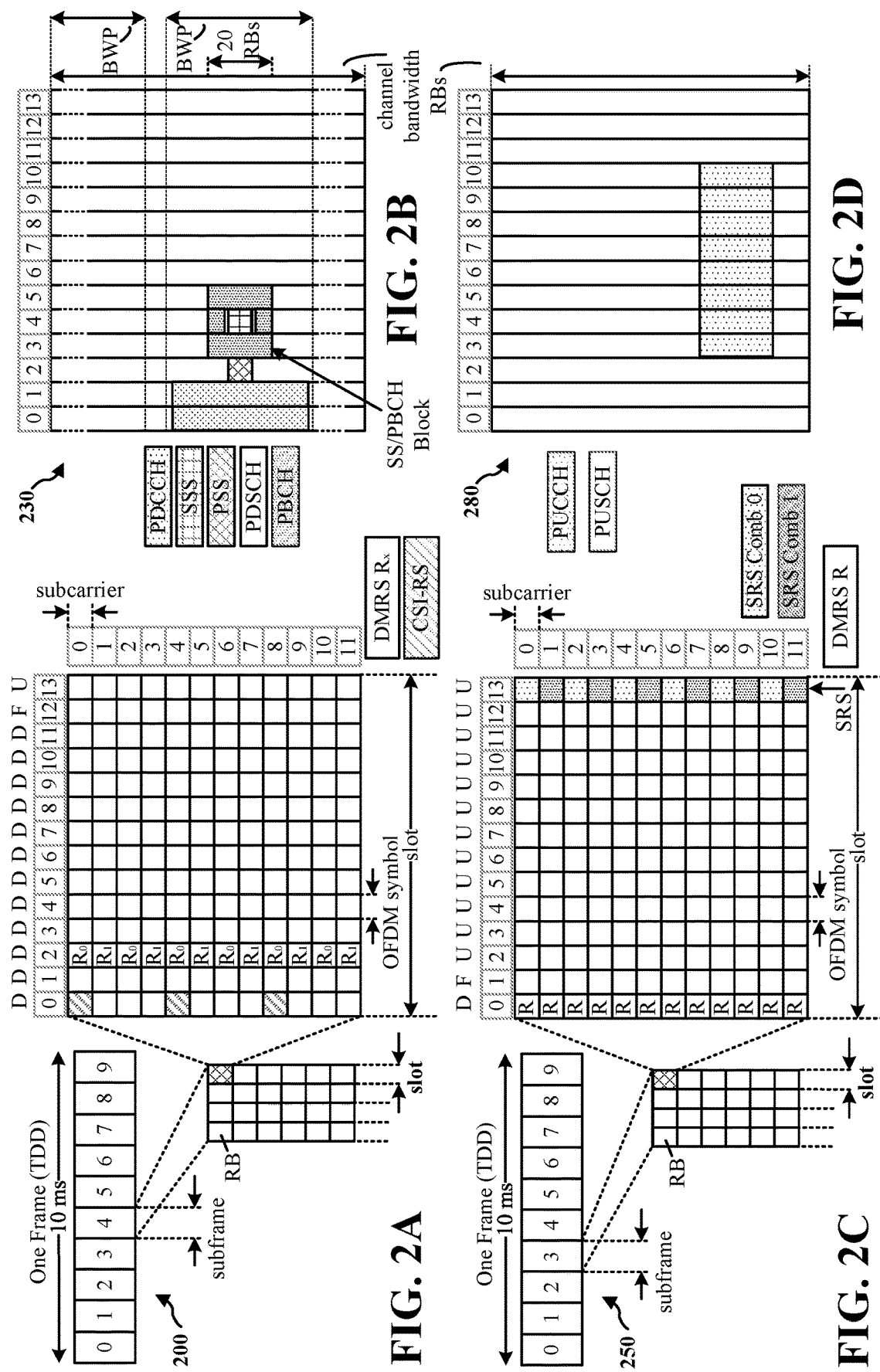
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
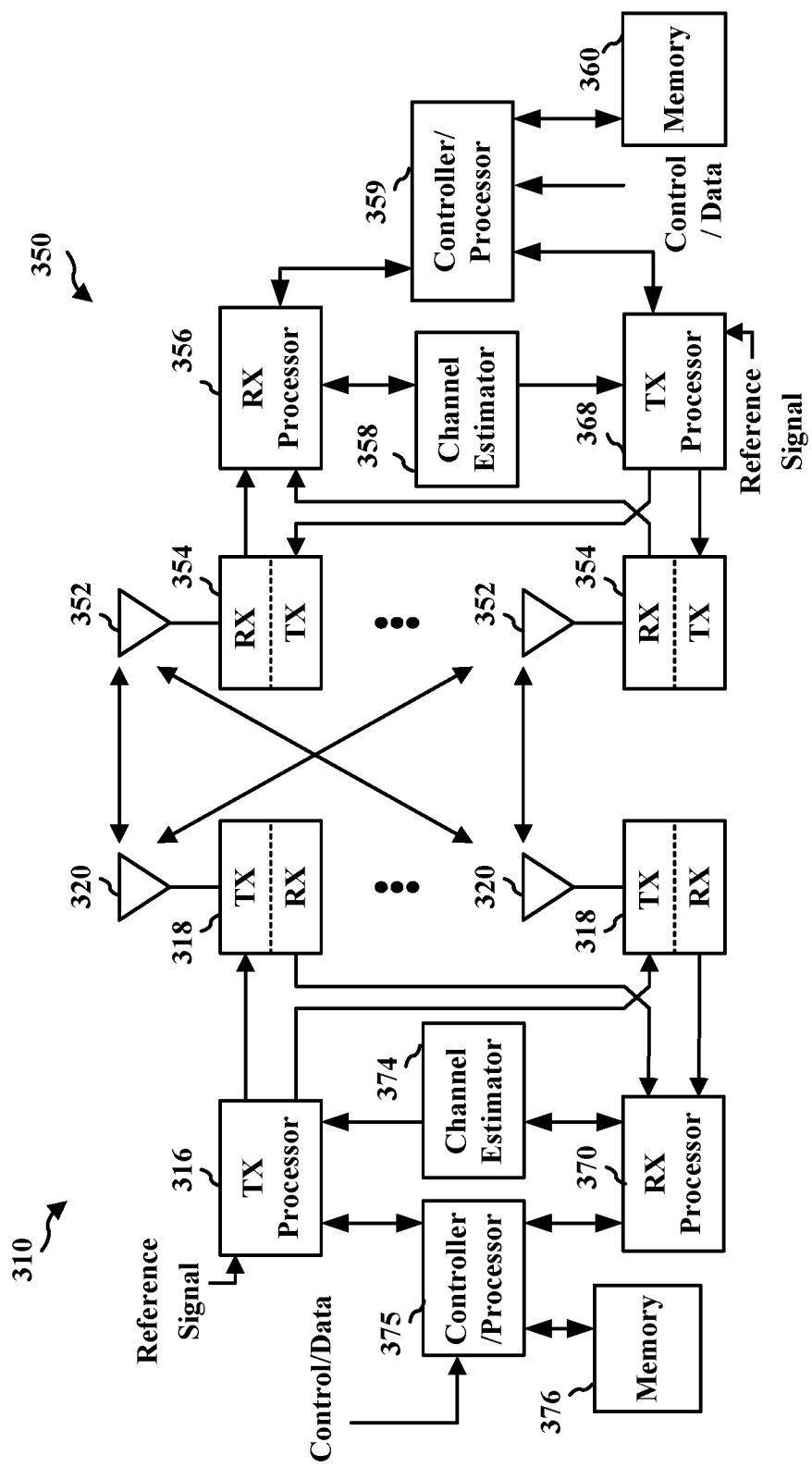
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the slot aggregation and SFN determination component 198 of FIG. 1.

At least one of the TX processor 316, the RX processor 370, and the controller/processor 375 may be configured to perform aspects in connection with the slot aggregation and SFN configuration component 199 of FIG. 1.

Figure 4A:
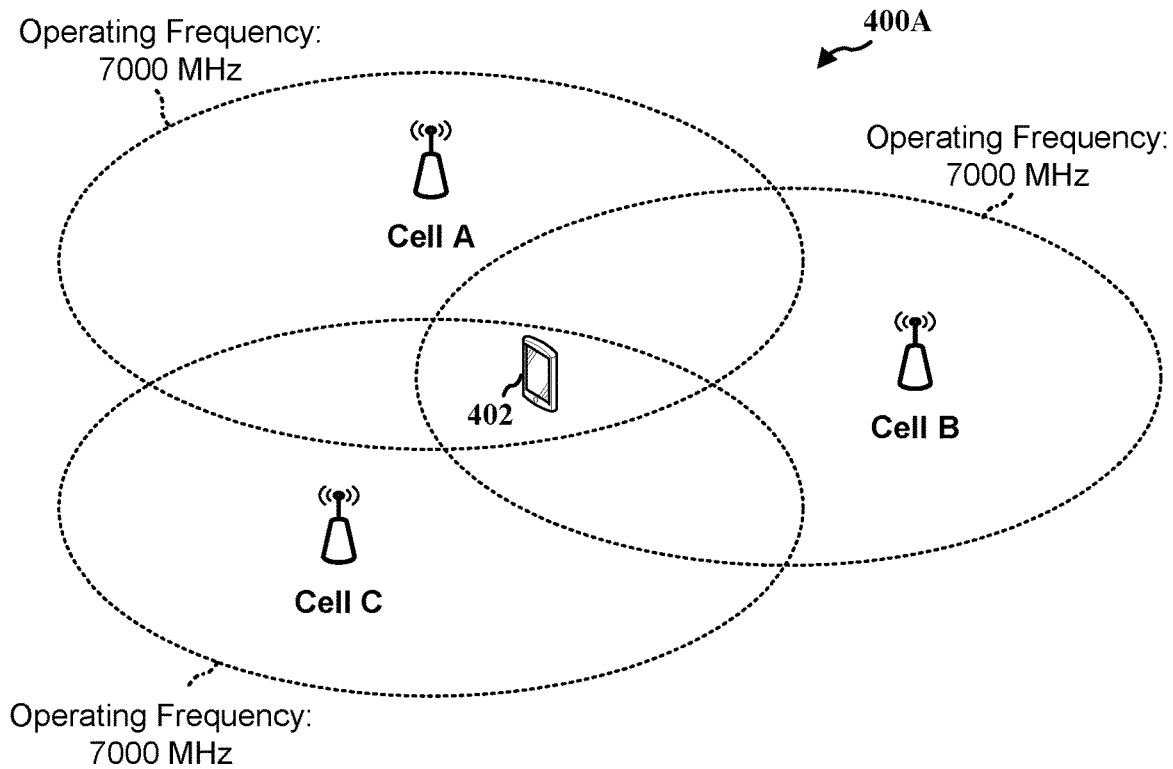
FIGS. 4A and 4B and are diagrams illustrating examples of the SFN and the non-SFN in accordance with various aspects of the present disclosure.
Figure 4B:
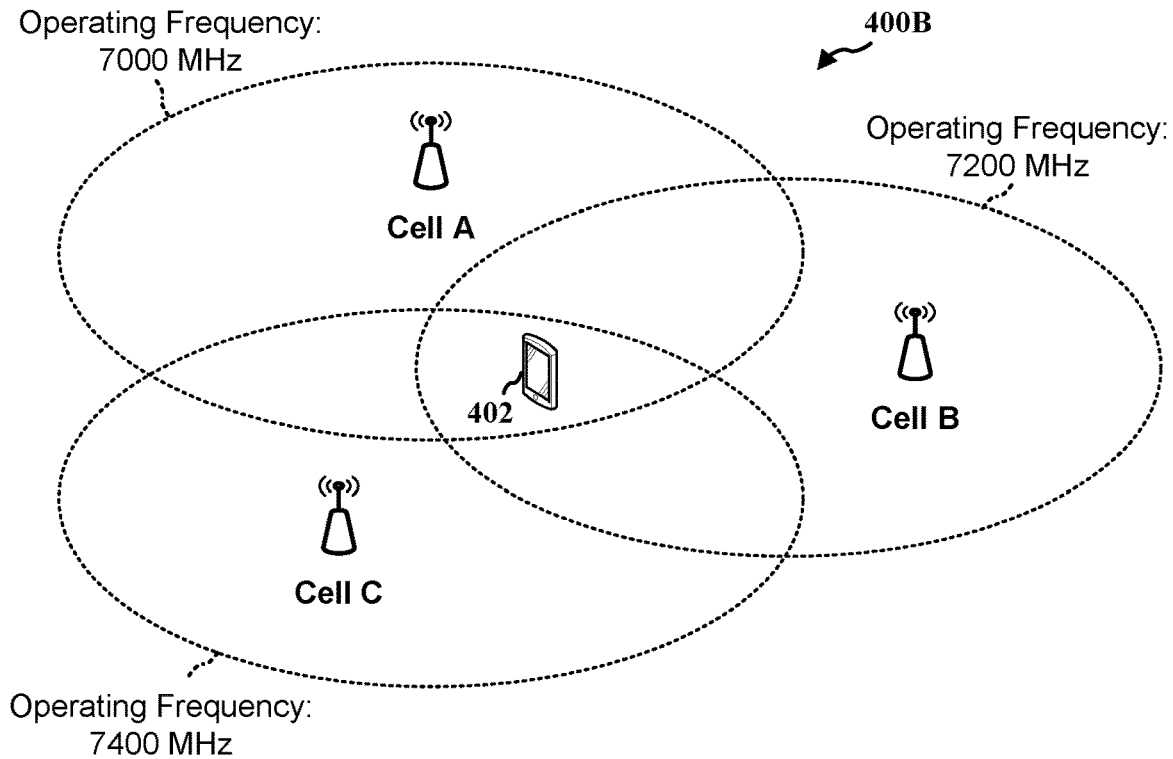

A communication network may support a single frequency network (SFN) operation. Under the SFN operation, base stations (e.g., cells, TRPs, etc.) may use the same frequency to transmit (e.g., multicast, broadcast, etc.) the same information. This may enable the network to extend the coverage area without the use of additional frequencies. For example, FIG. 4A is a diagram 400A illustrating an example of an SFN, where Cell A, Cell B and Cell C may operate under a same frequency to communicate with a UE 402, such as transmitting the same data on the same frequency and time resources to the UE 402. FIG. 4B is a diagram 400B illustrating an example of a non-SFN or a multi-frequency network (MFN), where each cell (e.g., Cell A, Cell B and Cell C) may operate under different frequencies, and may communicate with the UE 402 using different frequencies and/or time resources. A network may support both the SFN mode and the non-SFN mode, and may switch between the SFN and the non-SFN modes while communicating with a UE. Under the SFN mode, interference between base stations and the UE may be reduced as multiple base stations may serve the UE with the same frequency. In some examples, the SFN mode may improve the communication (e.g., transmission power) from the base station as more base stations may be used for transmitting the data. The SFN may also support information broadcast, where multiple base stations may broadcast information to multiple UEs at the same time.

As described previously, a base station may communicate with a UE based on beamforming. When a network is operating under the non-SFN mode and a UE is communicating with a base station, the beam from the UE (e.g., Tx and/or Rx beam(s) of the UE) and the beam from the base station (e.g., Tx and/or Rx beam(s) of the base station) may be pointing toward each other or aligned in a related direction. For example, FIG. 5A is a diagram 500A illustrating an example of a beamforming under a non-SFN mode. A base station 504 may use a beam 508 to communicate with a UE 502, such as transmitting data to the UE 502, and the UE 502 may use a beam 510 to communicate with the base station 504, such as receiving the data from the base station 504. On the other hand, when the network is operating under the SFN mode, a UE may be communicating with multiple base stations, such as shown by FIG. 4A. In some examples, an SFN may be a transparent SFN or a non-transparent SFN. Under the transparent SFN, a UE may not know if a transmission/communication from a base station is coming from multiple base stations/TRPs and/or from other base station(s)/TRP(s), whereas under the non-transparent SFN, a UE may know if a transmission/communication from a base station is coming from multiple base stations/TRPs and/or from other base station(s)/TRP(s).

FIG. 5B is a diagram 500B illustrating an example of a transparent SFN. The UE 502 may be served by a base stations 504 and a base station 506, where the base stations 504 and 506 may simultaneously transmit a same data using a same frequency resource to the UE 502 with beams 508 and 512, respectively. However, the UE 502 may not be aware of the transmission from the base station 506 or the beam 512, and the UE 502 may not have a configured beam to communicate with the base station 506. For example, the UE 502 may use a beam 510 to communicate with the base station 504, but the beam 510 may not in whole or in part aligned with the beam 512. In other words, the UE 502 may not know that a transmission is transmitted or broadcasted from multiple base stations or other base station(s) under the transparent SFN operation. Note that while the example illustrates the concept for two base stations 504 and 506, the concept may be applied for more than two base stations (e.g., four, six etc.) that may be deployed to communicate with the UE 502 using same frequency resources under the SFN.

Under the non-transparent SFN, such as shown by diagram 500C in FIG. 5C, a UE 502 may receive an indication from a serving base station 504 that one or more transmission beams (e.g., beams 508 and 512) may be used for communicating with the UE 502 from different or with multiple base stations (e.g., base stations 504 and 506). In other words, the base station 504 may indicate to the UE 502 that the transmission is transmitted under the SFN mode. In response, the UE 502 may configure a beam 510 for communicating with (e.g., receiving data from) the base station 504, and may configure another beam 514 for communicating with the base station 506. Optionally, instead of using a separate or additional beam (e.g., the 514) for communicating with the base station 506, the UE 502 may also configure a beam that is able to communicate with both base stations 504 and 506, such as by using a wider beam. Thus, the UE 502 may optimize the communication (e.g., data reception) if the UE 502 is aware that one or more transmissions are transmitted from multiple base stations (e.g., transmitted under the SFN mode).

In some examples, a base station may inform a UE regarding beam(s) used by the base station(s)/TRP(s) for communicating with the UE by sending a transmission configuration indicator (TCI) state to the UE, such as via a DCI. For example, the base station may indicate to the UE that it is using a first TCI state (e.g., TCI state #1) to communicate with the UE, where the first TCI state may correspond to a Tx/Rx beam or a set of Tx/Rx beams of the base station. In response, the UE may adjust its beam(s) for communicating with the base station. If the TCI state include a set of beams (e.g., multiple beams), each beam in the set of beams may come from different base stations under the SFN mode. For example, the TCI state may indicate that the base station is using three beams to communicate with (e.g., to transmit to) the UE, where one beam may come from a first base station (e.g., base station A), one beam may come from a second base station (e.g., base station B), and one beam may come from a third base station (e.g., base station C), etc. Under the transparent SFN mode, the UE may not be aware that the transmission is transmitted from the three base stations. Thus, the UE may treat the transmission as if there is no SFN, such as by receiving the transmission using one beam that is aligned with one base station. On the other hand, under the non-transparent SFN, the UE may be made aware of the transmission from multiple base stations and beam(s) used by each base station.

A network may improve the reliability of a transmission based on slot aggregation. Under slot aggregation, an initial transmission of a packet may be followed by repetitions of the same packet, such as in consecutive slots. An aggregation factor (e.g., number of repetitions) K may be configured by a higher layer of the network, where K=1 may indicate there is no aggregation (e.g., repetition) after the initial transmission and K=8 may indicate there is seven aggregations after the initial transmission. As a same packet (e.g., data) may be transmitted multiple times by a transmitting device (e.g., a base station or a UE), a receiving device may have a higher chance of accurately/successfully receiving the packet, thereby improving the reliability of the transmission. In addition, each repetition of the slot aggregation may be transmitted from a different beam of a base station and/or from a different base station (e.g., TRP). For example, a first repetition (e.g., repetition #1) may be transmitted from a first TRP (e.g., TRP #1) based on a first (e.g., beam 1) of the first TRP, and second repetition (e.g., repetition #2) may be transmitted from a second TRP (e.g., TRP #2) or a second beam (e.g., beam 2) of the first TRP, etc.

Aspects presented herein may enable a network to optimize a communication between a base station and a UE by applying slot aggregation and an SFN mode to the communication. In one aspect, the slot aggregation may be combined with an SFN transmission, where a data packet may be transmitted from one or more base stations using same frequency resources under the SFN mode, and the data packet may also be transmitted with repetitions over slots (e.g., based on the slot aggregation).

In some examples, a UE may experience that a combined transmission from multiple channels/beams or base stations under the SFN mode may have a worse performance than a transmission (e.g., a non-combined single channel transmission) from an individual base station (e.g., under the non-SFN mode). For example, feedings from different beams and base stations may cancel each other instead of combining. In other examples, the UE may experience that the combined transmission under the SFN yields better performance than the single channel transmission. As such, by enabling a network to apply/configure both the slot aggregation and the SFN mode for transmissions, the network (e.g., the base station and/or the UE) may have more flexibility in scheduling and configuring transmissions. For example, a wireless device (e.g., a base station or UE) may transmit different data repetitions from different base stations/beams, or transmit one or more repetitions under the SFN mode and one or more repetitions under the non-SFN mode, etc. For example, a UE may be configured to receive a first repetition (e.g., repetition #1) from a first base station/TRP (e.g., base station 1 or TRP1), receive a second repetition (repetition #2) from a second base station/TRP (e.g., base station 2 or TRP2), and receive a third repetition (e.g., repetition #3) from both of the first base station and the second base station (e.g., under the SFN mode), etc. In some examples, if a base station is under a broadcast mode (e.g., the base station is transmitting broadcast messages to one or more UEs), the base station may not know the location of the receiving UE(s). Thus, by sending a transmission with repetitions and from different base stations and/or beams, the receiving UE(s) is more likely to receive the transmission successfully.

To enable slot aggregation while the base station is transmitting under the SFN mode, a combined SFN TCI state and non-SFN TCI state (e.g., regular TCI state) may be configured in one slot aggregation, where one or more aggregated (e.g., repeated) slots may be configured with the SFN transmission and one or more aggregated slots may be configured with the non-SFN transmission. In one aspect of the present disclosure, if a transmission is associated with the non-transparent SFN where the UE may be aware of the beams used by one or more base stations for communicating with the UE, such as described in connection with FIG. 5C, the UE may determine its beam(s) in advance to optimize the reception of the transmission. In another aspect of the present disclosure, one or more SFN transmissions/repetitions may be configured or arranged to locate after the non-SFN transmissions/repetitions to provide a UE with more time to adjust the FFT window and/or frequency error correction, and/or to adjust its beam(s) to receive one or more transmissions/repetitions from other directions. For example, during a single (e.g., non-SFN) transmission, a UE may refine its receiving (e.g., Rx) beam(s) based on DM-RS, and then the UE may determine one or more best receiving beam(s) and/or channel equalizers for the SFN (e.g., a combined channel from previous non-SFN beams).

In one example, a base station may enable slot aggregation with SFN mode by configuring the slot aggregation at the base station and sending an indication to a receiving UE regarding beam(s) used for each slot aggregation (e.g., repetition), where some slots/repetitions may be transmitted using one or more beams associated with the SFN mode and some slots/repetitions may be transmitted using one or more beams associated with the non-SFN mode.

Figure 6:
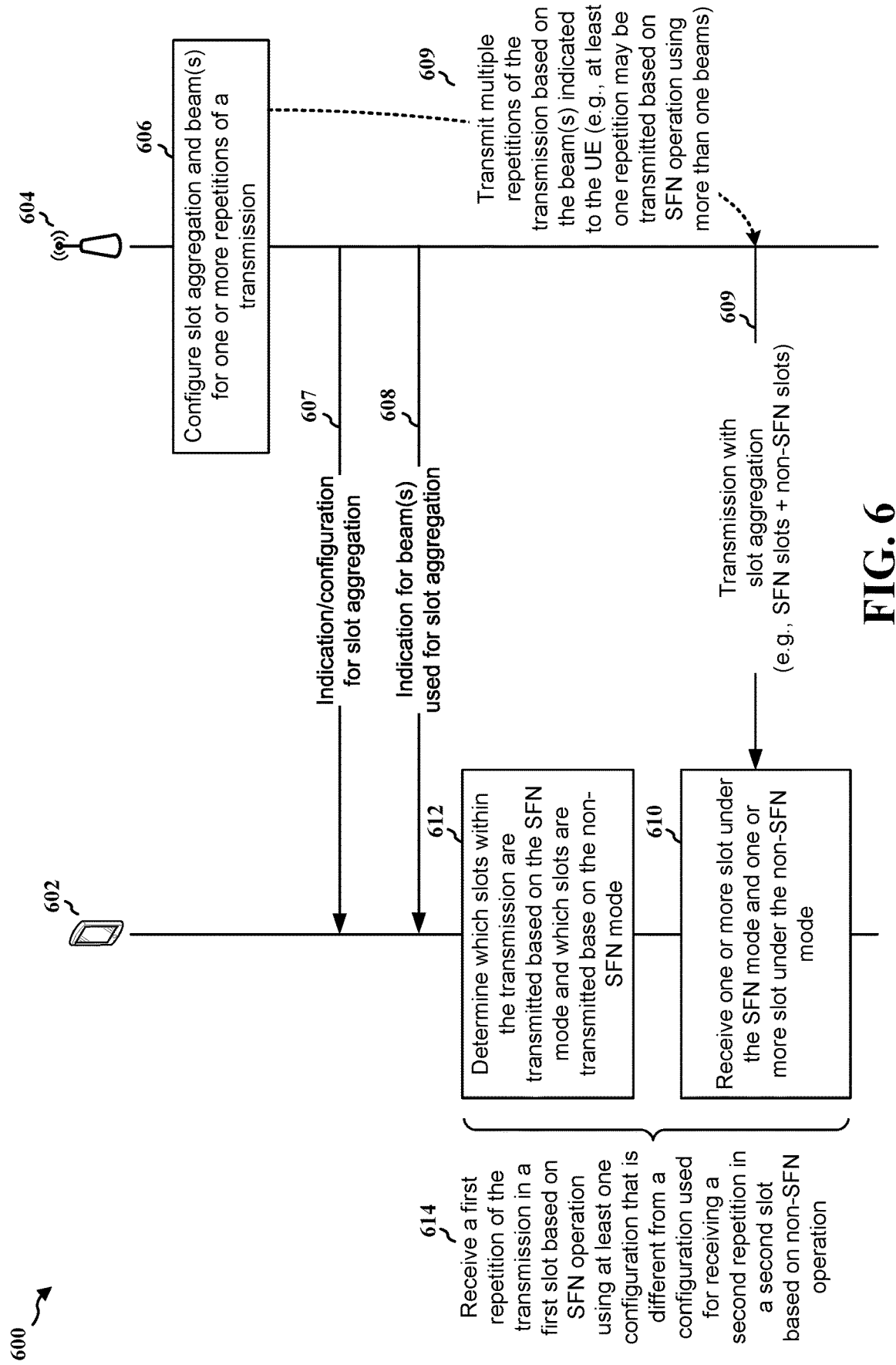
FIG. 6 is a diagram illustrating an example communication flow between a UE and a base station in accordance with various aspects of the present disclosure.

FIG. 6 is a communication flow 600 illustrating an example of a communication between a UE 602 and a base station 604 based on slot aggregation and SFN/non-SFN modes according to various aspects of the present disclosure. At 606, the base station 604 may configure and apply slot aggregation to a transmission, such as by configuring and assigning an aggregation factor K for the transmission. The base station 604 may also configure one or more beam(s) used for transmitting each slot (or repetition) of the slot aggregation at 606, where one or more beams may be configured for transmitting SFN slots (e.g., slots transmitted under the SFN mode) and one or more beams may be configured for transmitting non-SFN slots (e.g., slots transmitted under the non-SFN mode).

At 607, the base station 604 may transmit an indication or a configuration to the UE 602 indicating that the transmission from the base station 604 is configured with slot aggregation and the aggregation level (e.g., number of repetitions). The indication or the configuration may also configure the UE 602 to receive multiple repetitions of a transmission based on the slot aggregation.

At 608, the base station 604 may transmit an indication to the UE 602 indicating one or more beam(s) used for each slot within the slot aggregation (e.g., used for each repetition of the transmission). The indication may include one or more TCI states, and the transmission may be transmitted in a DCI. For example, the base station 604 may indicate that a first slot in the transmission (e.g., slot aggregation) is transmitted based on a first TCI state (e.g., TCI state #1), a second slot is transmitted based on a second TCI state (e.g., TCI state #2), and a third slot is transmitted based on a third TCI state (e.g., TCI state #3), where beams associated with the third TCI state may include beams used for the first TCI state and/or the second TCI state, etc. The indication for slot aggregation at 607 and the indication for transmitting beam (s) at 608 may be transmitted within one indication (e.g., message), such as via a DCI, or they may be transmitted as two separate indications through different messages.

At 609, the base station 604 may transmit multiple repetitions of the transmission based on the beam(s) indicated to the UE 602 (e.g., at least one repetition may be transmitted based on SFN operation using more than one beams). In other words, the base station 604 may transmit the transmission with slot aggregation that includes SFN slots and non-SFN slots.

As illustrated previously, an SFN may be operated under the transparent mode or the non-transparent mode. When the SFN is operating under the transparent mode, the UE 602 may not be aware that the transmission is coming from more than one base stations (e.g., TRPs). In some examples, if the base station 604 is transmitting the SFN slots under the transparent SFN mode, at 610, the UE 602 may be configured to receive the transmission (e.g., both SFN and non-SFN slots) assuming that the transmission is not transmitted with the SFN mode. In other words, the UE 602 may receive the transmission based on a non-SFN setting as if there is no SFN. For example, the UE 602 may determine the beam(s) for receiving the transmission under the assumption that the transmission comes from the base station 604 and not from other base station(s)/TRP(s).

On the other hand, if the base station 604 is transmitting the SFN slots under the non-transparent SFN mode, at 612, based at least in part on the indication(s) transmitted at 607 and/or 608, the UE 602 may additionally determine which slots within the transmission are transmitted based on the SFN mode and which slots are transmitted base on the non-SFN mode. In some examples, by determining which slots are SFN slots (e.g., slots transmitted under the SFN mode) and which slots are non-SFN slots (e.g., slots transmitted under the non-SFN mode), the UE 602 may further determine one or more configurations for receiving the SFN slots and the non-SFN slots, such as determining its receiving beam(s) and/or to optimize the reception of the transmission at 610. In other examples, power delay profile (PDP) of the channel for transmitting the SFN slots may be different from PDP of the channel for transmitting the non-SFN slots. As such, by determining which slots are SFN slots and which slots are non-SFN slots, as shown at 614, the UE 602 may determine a first configuration for receiving the SFN slots and a second configuration (e.g., a configuration that is different from the first configuration) for receiving the non-SFN slots. For example, the UE 602 may use a same beam and/or receiver spatial filter for receiving the SFN-slots and the non-SFN slots, but the UE 602 may use different tracking reference signals (TRSs) for SFN slots and non-SFN slots to derive different power delay profiles for the SFN and non-SFN channel. The UE 602 may also use different PDP assumption to perform channel estimation and decoding.

For example, the UE 602 may know that a first slot (e.g., slot #1) is transmitted under the non-SFN mode by the base station 604, and a second slot (e.g., slot #2) and a third slot (e.g., slot #3) are transmitted under the SFN mode by the base station 604 and a second base station from two different directions. Thus, in some examples, the UE 602 may determine to use a first receiving beam that is pointing toward the base station 604 for receiving the first slot, and the UE 602 may determine to use a second receiving beam that is pointing toward the base station 604 or the second base station for receiving the second slot and the third slot. In other examples, the UE 602 may determine to use a first receiving configuration (e.g., a first PDP) for receiving the first slot, and the UE 602 may determine to use a second receiving configuration (e.g., a second PDP) for receiving the second slot and the third slot, etc.

In some examples, the UE 602 may determine which receiving beam(s)/configuration(s) to use based on the channel condition between the UE 602 and the base stations/

TRPs (e.g., the base station 604 and the second base station), where the UE 602 may choose a receiving beam that is pointing toward a base station or a receiving configuration that has a better channel condition. Alternatively, or additionally, the UE 602 may use a receiving beam (but with same or different receiving configurations) to receive from both base stations, such as by using a wider beam what is capable of receiving beams from both base stations. In another example, the UE 602 may also use one receiving beam for each base station, such that there is a first beam for receiving the SFN slots from the base station 604 and a second beam for receiving the SFN slots from the second base station, etc. Note while the example uses two base stations for the illustration, more than two base stations (e.g., four, six, etc.) may be deployed to transmit the SFN slots and from more than two directions.

Aspects presented herein may enable the UE 602 to determine whether a slot within the transmission is transmitted by the base station 604 under the SFN mode or the non-SFN mode. In one aspect, the base station 604 may transmit an explicit indication to the UE 602 indicating which slots are transmitted under the SFN mode and which base stations/TRPs are transmitting these SFN slots, such as at steps 607 and/or 608 or at an additional step. For example, the base station 604 may signal to the UE that the third slot (e.g., slot #3) is to be transmitted from the base station 604 using a first beam (e.g., beams #1) and a second beam (e.g., beam #2) under the SFN mode, etc.

In another aspect, the UE 602 may identify the SFN slots and non-SFN slots based at least in part on the beam configuration used for each slot aggregation. For example, the base station may configure one beam (e.g., one TCI state) for non-SFN slots and multiple beams (e.g., multiple TCI states) for SFN slots. Thus, when the UE 602 receives the beam configuration (e.g., at 608) from the base station 604, the UE 602 may identify the slot type for each slot (e.g., SFN or non-SFN) based on the number of beams (e.g., number of TCI states) configured for each slot. In another example, the base station 604 may associate/map a tracking reference signal (TRS), such as CRI-RS, to a TCI state, where the UE 602 may use the TRS to derive refined time and/or frequency tracking of PDSCH/PDCCH channel(s). The UE 602 may also derive one or more channel statistics of the corresponding TCI state associated with TRS, where the one or more channel statistics may include power delay profile of the beamformed channel of the TCI state, and/or the doppler profile, etc. As such, the base station may configure/associate one TRS for non-SFN slots and multiple TRSs for SFN slots. Thus, when the UE 602 receives the beam configuration (e.g., at 608) from the base station 604, the UE 602 may identify the slot type for each slot (e.g., SFN or non-SFN) based on the number of TRSs configured for or associated with each slot.

In another aspect, the UE 602 may identify the SFN and non-SFN slots based on a predefined rule or configuration. For example, the base station 604 may configure an aggregation factor K to the slot aggregation and indicate (K−1) beams to the UE 602, where each of the (K−1) beams may come from (K−1) TRPs. Then the first (K−1) slots may be transmitted using (K−1) single beams, and the last (k-th) slot may be transmitted using an SFN beam (e.g., a combination of the (K−1) beams). For example, if the base station 604 configures an aggregation factor five (e.g., K=5) for the slot aggregation, then the first four slots (e.g., (K−1) slots) may be transmitted using four single beams (e.g., (K−1) beams) from four TRPs (e.g., (K−1) TRPs), and the fifth slot (e.g., K-th slot) may be transmitted using the SFN beam that may be the combination of the four beams (e.g., (K−1) beams). In another example, a more complicated combination of SFN and non-SFN slots may also be configured by the base station, where some slots may use a single beam for the non-SFN and some slots may use a subset of beams (not all beams) for the SFN. For instance, SFN slot #1 may use beams #1 and #2, SFN slot #2 may use beams #2 and #3, SFN slot #3 may use beams #1 and #3, etc. The determination of which beam(s) to use for each slot may be based on a preconfigured table or a predefined rule, such that the base station 604 may assign the beam(s) used for each slot based on the preconfigured table or the predefined rule. In response, the UE 602 may adjust its beams based on the preconfigured table or the predefined rule as well.

When a transmission may be transmitted from multiple TRPs (e.g., TRP #1 706 and TRP #2 708), a TCI code point consisting of at least two TCI states (e.g., a pair of beams—TCI state #1 and TCI state #2) may be used by the base station for configuring beam(s) for the transmission. For example, a first slot may use TCI state #1 in the TCI code point, the second slot may use TCI state #2 in the TCI code point, and the third slot may use both TCI state #1 and TCI state #2 in the TCI code point, etc. Note that the use of "first" and "second" does not specify a particular temporal order and merely indicates different slots or repetitions. Thus, in the slot aggregation, as a PDSCH transmission may be repeated over multiple slots, a TCI code point may be used for the PDSCH transmission such that multiple slots within the transmission may be transmitted using one or more of the two TCI states defined by the TCI code point (e.g., by alternating between or using both the two TCI states, etc.). In one aspect, in addition to the alternation of the TCI states, the SFN transmission may further be configured for the slot aggregation, such as described in connection with FIGS. 5A, 5B, 5C, and 6.

Figures 7A, 7B, 7C:
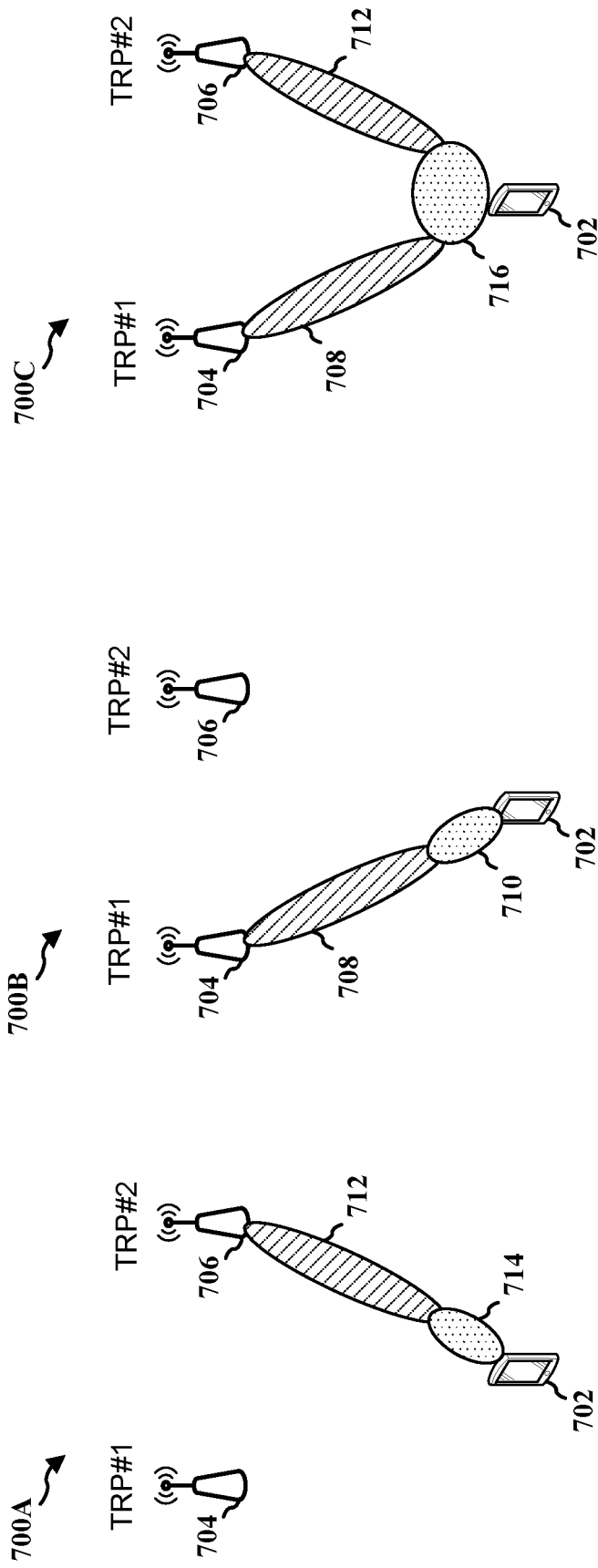
FIGS. 7A, 7B, and 7C are diagrams illustrating examples of beamforming under the non-transparent SFN in accordance with various aspects of the present disclosure.

FIGS. 7A, 7B, and 7C are diagrams 700A, 700B and 700C illustrating examples of applying slot aggregation to a non-transparent SFN. In one example, under the non-transparent SFN mode, if a slot aggregation with an aggregation factor of 3 (e.g., K=3) is configured by a base station that is associated with a first TRP 704 (e.g., TRP #2) and a second TRP 706 (e.g., TRP #2), a TCI code point containing TCI state #1 and TCI state #2 may further be configured for the slot aggregation, such that slot #1 may use TCI state #1, slot #2 may use TCI state #2, slot #3 may use one or more SFN beams that include both TCI state #1 and TCI state #2, etc. As shown by FIG. 7A, the UE 702 may configure a beam 714 for receiving slot #1 from the second TRP 706 that is transmitted from a beam 712 indicated by the TCI state #1. As shown by FIG. 7B, the UE 702 may configure a beam 710 for receiving slot #2 from the first TRP 704 that is transmitted in a beam 708 indicated by the TCI state #2. As shown by FIG. 7C, the UE 702 may configure a beam 716 for receiving slot #3 (e.g., SFN slot) that is transmitted from both the first TRP 704 and the second TRP 706 using beams 708 and 712, respectively, as indicated by both TCI state #1 and TCI state #2. Note that the use of "first" "second" and "third" (e.g., #1, #2 and #3) does not specify a particular temporal order and merely indicates different repetitions. For example, the second and the third repetition may be received prior to receiving the first slot (e.g., repetition), etc.

Figure 8:
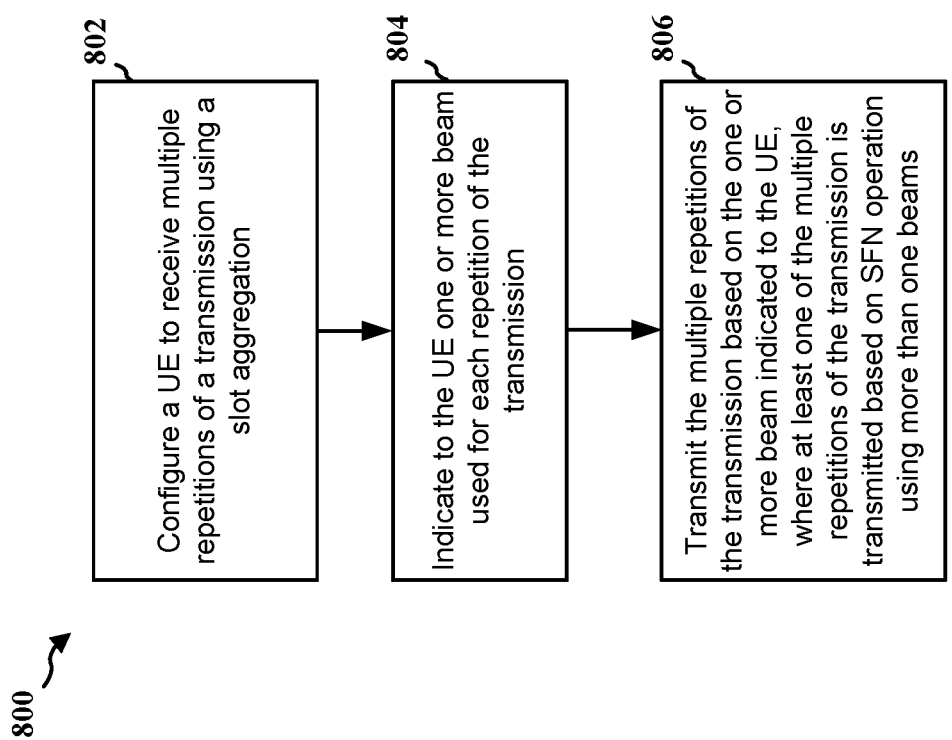
FIG. 8 is a flowchart of a method of wireless communication in accordance with various aspects of the present disclosure.

FIG. 8 is a flowchart 800 of a method of wireless communication. The method may be performed by a base station or a component of a base station (e.g., base station 102, 180, 310, 504, 604; TRP 704, 706; the apparatus 902; which may include the memory 376 and which may be the entire base station 310 or a component of the base station 310, such as the TX processor 316, the RX processor 370, and/or the controller/processor 375). The method may enable the base station to configure slot aggregation to a transmission and transmit some of the slots within the slot aggregation under the SFN mode and some of the slots under the non-SFN mode.

At 802, the base station may configure a UE to receive multiple repetitions of a transmission using a slot aggregation, such as described in connection with FIGS. 6, 7A, 7B, and 7C. For example, at 606 and 607, the base station 604 may configure slot aggregation and beam(s) for one or more repetitions of a transmission, and the base station 604 may transmit the indication/configuration for the slot aggregation to the UE 602. The configuration of the slot aggregation may be performed by, e.g., the slot aggregation configuration component 940 and/or the transmission component 934 of the apparatus 902 in FIG. 9.

At 804, the base station may indicate to the UE one or more beams used for each repetition of the transmission, such as described in connection with FIGS. 6, 7A, 7B, and 7C. For example, at 608, the base station 604 may indicate to the UE 602 one or more beams used for slot aggregation (e.g., for each repetition of the transmission). The indication of the one or more beams may be performed by, e.g., the beam indication component 942 and/or the transmission component 934 of the apparatus 902 in FIG. 9.

In one example, the base station may indicate a set of the one or more beams in a configuration for the slot aggregation. In another example, the one or more beams used for each repetition of the transmission may be indicated to the UE through a TCI state, where the TCI state may be transmitted in a DCI, such as described in connection with FIG. 6.

At 806, the base station may transmit the multiple repetitions of the transmission based on the one or more beams indicated to the UE, where at least one of the multiple repetitions of the transmission is transmitted based on SFN operation using more than one beams, such as described in connection with FIGS. 6, 7A, 7B, and 7C. For example, at 609, the base station 604 may transmit multiple repetitions of the transmission based on the one or more beams indicated to the UE 602, where at least one repetition may be transmitted based on SFN operation using more than one beams. The transmission of the multiple repetitions may be performed by, e.g., the slot aggregation process component 944 and/or the transmission component 934 of the apparatus 902 in FIG. 9.

In one example, the multiple repetitions of the transmission may include the initial transmission. In another example, at least one of the multiple repetitions of the transmission may be transmitted based on non-SFN operation using a single beam, where the base station may indicate the one or more beams for each slot of the multiple repetitions to the UE, such as described in connection with FIG. 6. In another example, the base station may indicate the SFN operation based on multiple TCI states and the non-SFN operation based on a single TCI state, such as described in connection with FIG. 6. For instance, at least one of the multiple repetitions may be transmitted in a beam different from another repetition in the multiple repetitions.

Figure 9:
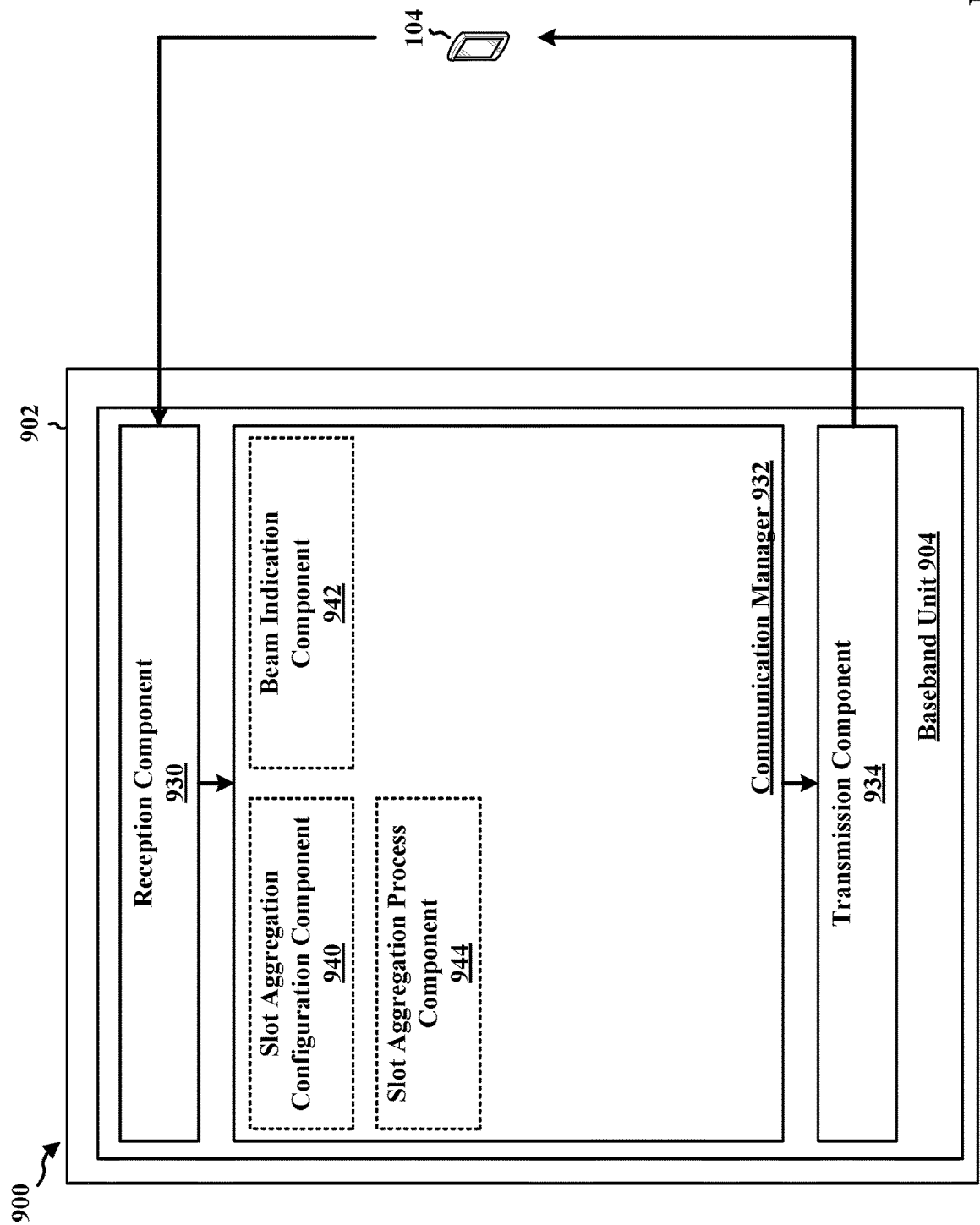
FIG. 9 is a diagram illustrating an example of a hardware implementation for an example apparatus in accordance with various aspects of the present disclosure.

FIG. 9 is a diagram 900 illustrating an example of a hardware implementation for an apparatus 902. The apparatus 902 is a base station and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a slot aggregation configuration component 940 that is configured to configure a UE to receive multiple repetitions of a transmission using a slot aggregation, e.g., as described in connection with 802 of FIG. 8. The communication manager 932 further includes a beam indication component 942 that is configured to indicate to the UE one or more beams used for each repetition of the transmission, e.g., as described in connection with 804 of FIG. 8. The communication manager 932 further includes a slot aggregation process component 944 that is configured to transmit the multiple repetitions of the transmission based on the one or more beams indicated to the UE, where at least one of the multiple repetitions of the transmission is transmitted based on SFN operation using more than one beams, e.g., as described in connection with 806 of FIG. 8.

The apparatus may include additional components that perform each of the blocks of the algorithm in the flowchart of FIG. 8. As such, each block in the flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for configuring a UE to receive multiple repetitions of a transmission using a slot aggregation (e.g., the slot aggregation configuration component 940 and/or the transmission component 934). The apparatus 902 includes means for indicating to the UE one or more beams used for each repetition of the transmission (e.g., the beam indication component 942 and/or the transmission component 934). The apparatus 902 includes means for transmitting the multiple repetitions of the transmission based on the one or more beams indicated to the UE, where at least one of the multiple repetitions of the transmission is transmitted based on SFN operation using more than one beams (e.g., the slot aggregation process component 944 and/or the transmission component 934).

The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 10:
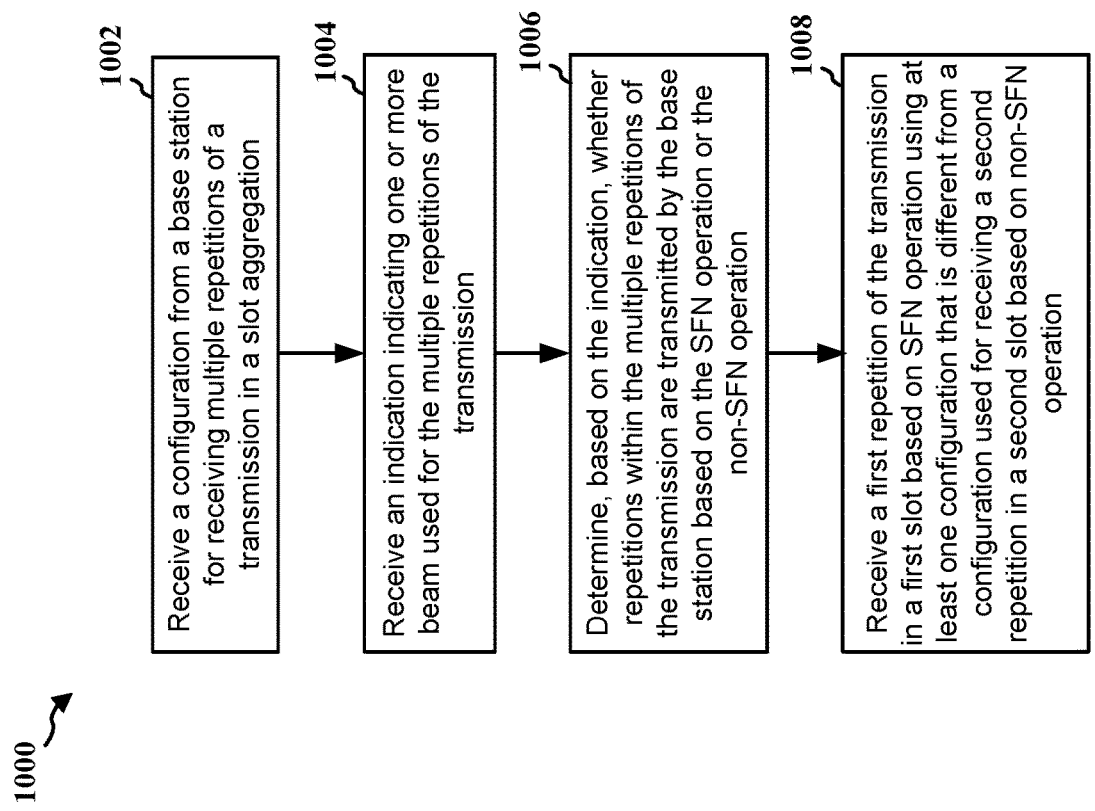
FIG. 10 is a flowchart of a method of wireless communication in accordance with various aspects of the present disclosure in accordance with various aspects of the present disclosure.

FIG. 10 is a flowchart of a method 1000 of wireless communication. The method may be performed by a UE or a component of a first UE (e.g., the UE 106, 350, 402, 502, 602, 702; the apparatus 1102; a processing system, which may include the memory 360 and which may be the entire UE 350 or a component of the UE 350, such as the TX processor 368, the RX processor 356, and/or the controller/processor 359). The method may enable the UE to receive slots under slot aggregation and under the SFN network. The method may also enable the UE to determine whether slots are transmitted by the base station under the SFN mode.

At 1002, the UE may receive a configuration from a base station for receiving multiple repetitions of a transmission in a slot aggregation, such as described in connection with FIGS. 5A, 5B, 5C, 6, 7A, 7B, and 7C. For example, at 607, the UE 602 may receive a configuration from the base station 604 for receiving multiple repetitions of a transmission based on slot aggregation. The reception of the configuration may be performed by, e.g., the slot aggregation process component 1140 and/or the reception component 1130 of the apparatus 1102 in FIG. 11.

In one example, the multiple repetitions of the transmission may include the initial transmission. In another example, each repetition may be a slot or a mini-slot.

At 1004, the UE may receive an indication indicating one or more beams used for the multiple repetitions of the transmission, such as described in connection with FIGS. 6, 7A, 7B, and 7C. For example, at 608, the UE 602 may receive an indication indicating one or more beams used for the multiple repetitions of the transmission from the base station 604. The reception of the indication may be performed by, e.g., the beam indication process component 1142 and/or the reception component 1130 of the apparatus 1102 in FIG. 11.

In one example, the indication may indicate the one or more beams used for each repetition of the transmission. In such an example, the one or more beams used for each repetition of the transmission may be indicated based on a TCI, where the UE may receive the TCI in a DCI. In another example, the indication may include a TCI code point comprising a first TCI state and a second TCI state.

At 1006, the UE may determine, based on the indication, whether repetitions within the multiple repetitions of the transmission are transmitted by the base station based on the SFN operation or the non-SFN operation, such as described in connection with FIGS. 6, 7A, 7B, and 7C. For example, at 612, the UE 602 may determine which slots within the transmission are transmitted based on the SFN mode and which slots are transmitted base on the non-SFN mode. The determination of the SFN slots and/or the non-SFN slots may be performed by, e.g., the SFN and non-SFN slots determination component 1144 of the apparatus 1102 in FIG. 11.

In one example, the UE may determine whether the repetition within the multiple repetitions is transmitted by the base station based on the SFN operation or based on the non-SFN operation is based on a number of beams used by the base station for transmitting the repetition, where the first repetition may be received using more than one beam and the second repetition comprises received using a single beam, etc. In another example, the indication may indicate a set of the one or more beams for the configuration for the slot aggregation, and the UE may determine whether the repetition within the multiple repetitions is transmitted by the base station under the SFN operation or under the non-SFN operation based on a preconfigured or a predefined rule, such as described in connection with FIG. 6. In another example, the UE may receive an explicit indication from the base station indicating whether each repetition is transmitted based on the SFN operation or based on the non-SFN operation.

At 1008, the UE may receive a first repetition of the transmission in a first slot based on SFN operation using at least one configuration that is different from a configuration used for receiving a second repetition in a second slot based on non-SFN operation, such as described in connection with FIGS. 6, 7A, 7B, and 7C. For example, at 614, the UE 602 may receive a first repetition of the transmission in a first slot based on SFN operation using at least one configuration that is different from a configuration used for receiving a second repetition in a second slot based on non-SFN operation. The reception of the SFN slot and the non-SFN slot may be performed by, e.g., the SFN and non-SFN slots process component 1146 and/or the reception component 1130 of the apparatus 1102 in FIG. 11.

In one example, the UE may configure the beams for receiving the repetitions based at least in part on whether a repetition (e.g., slot) is transmitted under the SFN mode or the non-SFN mode, such as described in connection with FIG. 6. For example, if the UE receives the first repetition based on the SFN operation using at least one beam or configuration that is different from a beam or configuration used for receiving the second repetition based on the non-SFN operation, the UE may receive the first repetition using a first beam indicated in the first TCI state and a second beam indicated in the second TCI state, receive the second repetition using the second beam indicated in the second TCI state, and receive a third repetition using both the first beam indicated in the first TCI, etc., such as described in connection with FIGS. 7A, 7B, and 7C. Note that the use of "first" "second" and "third" does not specify a particular temporal order and merely indicates different repetitions. For example, the second and the third repetition may be received prior to receiving the first slot (e.g., repetition), etc. In another example, the UE may determine one or more beams for receiving each repetition within the multiple repetition based on a preconfigured or a predefined rule. The repetition transmitted by the base station under the SFN operation may use more than one beams and each beam may come from a different base station or a different TRP.

Figure 11:
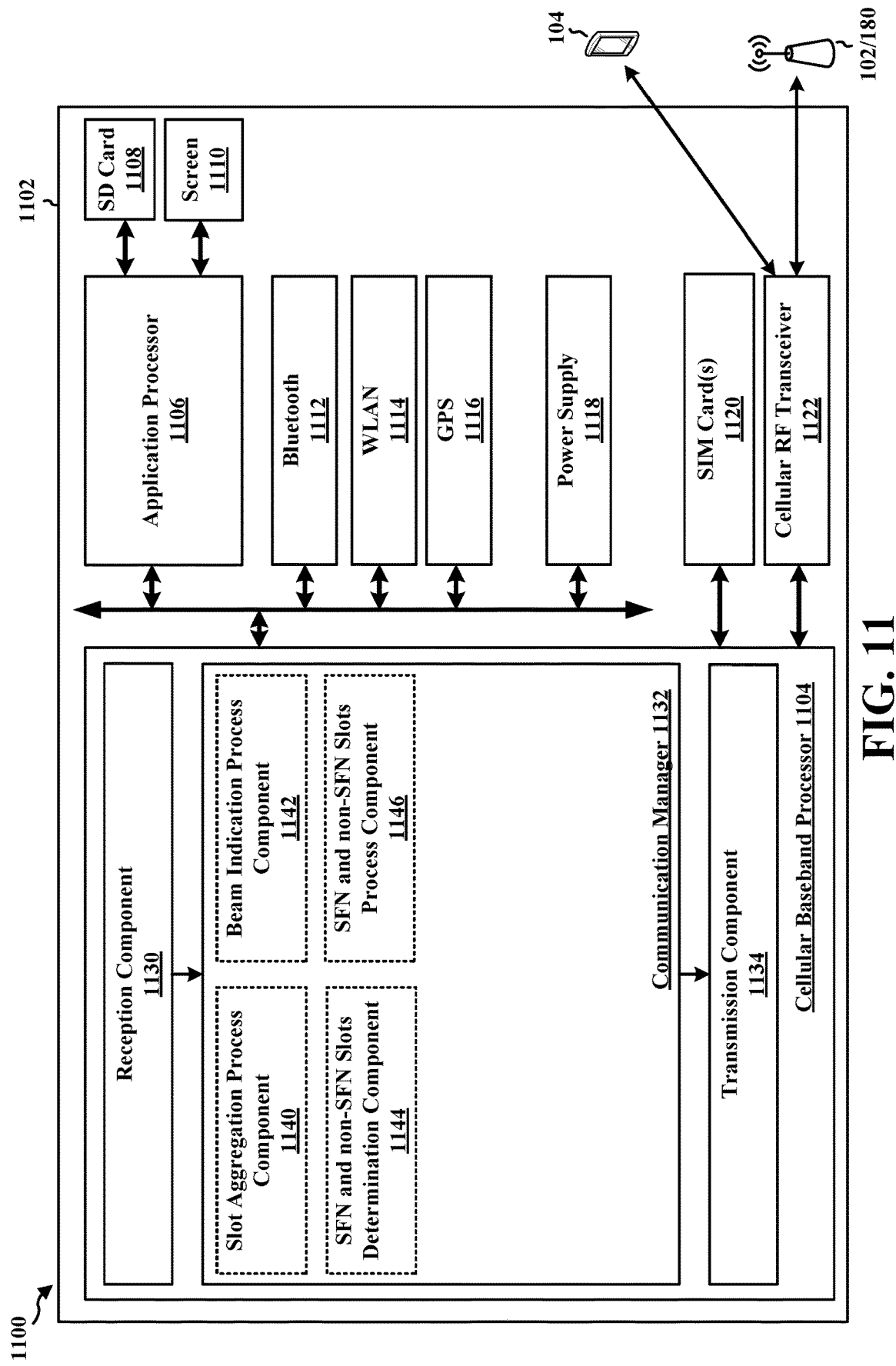
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include additional modules of the apparatus 1102.

The communication manager 1132 includes a slot aggregation process component 1140 that is configured to receive a configuration from a base station for receiving multiple repetitions of a transmission in a slot aggregation, e.g., as described in connection with 1002 of FIG. 10. The communication manager 1132 further includes a beam indication process component 1142 that is configured to receive an indication indicating one or more beams used for the multiple repetitions of the transmission, e.g., as described in connection with 1004 of FIG. 10. The communication manager 1132 further includes an SFN and non-SFN slots determination component 1144 that is configured to determine, based on the indication, whether repetitions within the multiple repetitions of the transmission are transmitted by the base station based on the SFN operation or the non-SFN operation, e.g., as described in connection with 1006 of FIG. 10. The communication manager 1132 further includes an SFN and non-SFN slots process component 1146 that is configured to receive a first repetition of the transmission in a first slot based on SFN operation using at least one configuration that is different from a configuration used for receiving a second repetition in a second slot based on non-SFN operation, e.g., as described in connection with 1008 of FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a configuration from a UE for receiving multiple repetitions of a transmission in a slot aggregation (e.g., the slot aggregation process component 1140 and/or the reception component 1130). The apparatus 1102 includes means for means for receiving an indication indicating one or more beams used for the multiple repetitions of the transmission (e.g., the beam indication process component 1142 and/or the reception component 1130). The apparatus 1102 includes means for means for determining, based on the indication, whether repetitions within the multiple repetitions of the transmission are transmitted by the base station based on the SFN operation or the non-SFN operation (e.g., the SFN and non-SFN slots determination component 1144). The apparatus 1102 includes means for means for receiving a first repetition of the transmission in a first slot based on SFN operation using at least one configuration that is different from a configuration used for receiving a second repetition in a second slot based on non-SFN operation (e.g., non-SFN slots process component 1146 and/or the reception component 1130).

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

The following aspects are illustrative only and may be combined with other aspects or teachings described herein, without limitation.

Aspect 1 is a method of wireless communication at a base station, comprising: configuring a UE to receive multiple repetitions of a transmission using a slot aggregation; indicating to the UE one or more beams used for each repetition of the transmission; and transmitting the multiple repetitions of the transmission based on the one or more beams indicated to the UE, wherein at least one of the multiple repetitions of the transmission is transmitted based on SFN operation using more than one beams.

In aspect 2, the method of aspect 1 further includes that at least one of the multiple repetitions of the transmission is transmitted based on non-SFN operation using a single beam.

In aspect 3, the method of aspect 1 or aspect 2 further includes that the base station indicates the one or more beams for each slot of the multiple repetitions In aspect 4, the method of any of aspects 1-3 further includes that the base station indicates a set of the one or more beams in a configuration for the slot aggregation.

In aspect 5, the method of any of aspects 1-4 further includes that the base station indicates the SFN operation based on multiple TCI states and the non-SFN operation based on a single TCI state.

In aspect 6, the method of any of aspects 1-5 further includes that at least one of the multiple repetitions is transmitted in a beam different from another repetition in the multiple repetitions.

In aspect 7, the method of any of aspects 1-6 further includes that the one or more beams used for each repetition of the transmission is indicated to the UE through a TCI state.

In aspect 8, the method of any of aspects 1-7 further includes that the TCI state is transmitted in a DCI.

In aspect 9, the method of any of aspects 1-8 further includes that the multiple repetitions of the transmission includes an initial transmission.

Aspect 10 is an apparatus for wireless communication at a base station, comprising: means for configuring a UE to receive multiple repetitions of a transmission using a slot aggregation; means for indicating to the UE one or more beams used for each repetition of the transmission; and means for transmitting the multiple repetitions of the transmission based on the one or more beams indicated to the UE, wherein at least one of the multiple repetitions of the transmission is transmitted based on SFN operation using more than one beams.

In aspect 11, the method of aspect 10 further comprises means to perform the method of any of aspects 2-9.

Aspect 12 is an apparatus for wireless communication at a base station, comprising: a memory; and at least one processor coupled to the memory, the memory and the at least one processor configured to perform the method of aspects 1-9.

Aspect 13 is a computer-readable medium storing computer executable code for wireless communication at a base station, the code when executed by a processor cause the processor to perform the method of any of aspects 1-9.

Aspect 14 is a method of wireless communication at a UE, comprising: receiving a configuration from a base station for receiving multiple repetitions of a transmission in a slot aggregation; receiving an indication indicating one or more beams used for the multiple repetitions of the transmission; and receiving a first repetition of the transmission in a first slot based on SFN operation using at least one configuration that is different from a configuration used for receiving a second repetition in a second slot based on non-SFN operation.

In aspect 15, the method of aspect 14 further includes that the indication indicates the one or more beams used for each repetition of the transmission.

In aspect 16, the method of aspect 14 or aspect 15 further comprises: determining, based on the indication, whether repetitions within the multiple repetitions of the transmission are transmitted by the base station based on the SFN operation or the non-SFN operation.

In aspect 17, the method of any of aspects 14-16 further includes that the UE determines whether the repetition within the multiple repetitions is transmitted by the base station based on the SFN operation or based on the non-SFN operation is based on a number of beams used by the base station for transmitting the repetition.

In aspect 18, the method of any of aspects 14-17 further includes that the first repetition is received using more than one beam and the second repetition comprises received using a single beam.

In aspect 19, the method of any of aspects 14-18 further includes that the indication indicates a set of the one or more beams for the configuration for the slot aggregation, and wherein the UE determines whether the repetition within the multiple repetitions is transmitted by the base station based on the SFN operation or based on the non-SFN operation is based on a preconfigured or a predefined rule.

In aspect 20, the method of any of aspects 14-19 further comprises: receiving an explicit indication from the base station indicating whether each repetition is transmitted based on the SFN operation or based on the non-SFN operation.

In aspect 21, the method of any of aspects 14-20 further includes that the one or more beams used for each repetition of the transmission is indicated based on a TCI.

In aspect 22, the method of any of aspects 14-21 further includes that the TCI is received in a DCI.

In aspect 23, the method of any of aspects 14-22 further includes that the multiple repetitions of the transmission includes an initial transmission.

In aspect 24, the method of any of aspects 14-23 further includes that the indication includes a TCI code point comprising a first TCI state and a second TCI state.

In aspect 25, the method of any of aspects 14-24 further includes that receiving the first repetition based on the SFN operation using at least one configuration that is different from a configuration used for receiving the second repetition based on the non-SFN operation includes: receiving the first repetition using a first beam indicated in the first TCI state and a second beam indicated in the second TCI state, receiving the second repetition using the second beam indicated in the second TCI state, and receiving a third repetition using both the first beam indicated in the first TCI.

In aspect 26, the method of any of aspects 14-25 further includes that each of the multiple repetitions is a slot or a mini-slot.

In aspect 27, the method of any of aspects 14-26 further comprises: determining a one or more beams for receiving each repetition within the multiple repetition based on a preconfigured or a predefined rule.

In aspect 28, the method of any of aspects 14-27 further includes that the repetition transmitted by the base station under the SFN operation uses more than one beams and each beam comes from a different base station or a different TRP.

Aspect 29 is an apparatus for wireless communication at a UE, comprising: means for receiving a configuration from a UE for receiving multiple repetitions of a transmission in a slot aggregation; means for receiving an indication indicating one or more beams used for the multiple repetitions of the transmission; and means for receiving a first repetition of the transmission in a first slot based on SFN operation using at least one configuration that is different from a configuration used for receiving a second repetition in a second slot based on non-SFN operation.

In aspect 30, the method of aspect 27 further comprises means to perform the method of any of aspects 15-28.

Aspect 31 is an apparatus for wireless communication at a UE, comprising: a memory; and at least one processor coupled to the memory, the memory and the at least one processor configured to perform the method of aspects 14-28.

Aspect 32 is a computer-readable medium storing computer executable code for wireless communication at a UE, the code when executed by a processor cause the processor to perform the method of any of aspects 14-28.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a base station, comprising:
   memory; and
   at least one processor coupled to the memory and configured to:
      configure a user equipment (UE) to receive multiple repetitions of a transmission using a slot aggregation, wherein the multiple repetitions include at least one single frequency network (SFN) operation and at least one non-SFN operation;
      indicate, to the UE, one or more beams used for each repetition of the transmission; and
      transmit the multiple repetitions of the transmission based on the at least one SFN operation, the at least one non-SFN operation, and the one or more beams indicated to the UE, wherein the at least one SFN operation uses more than one beams.

2. The apparatus of claim 1, wherein the at least one non-SFN operation uses a single beam.

3. The apparatus of claim 2, wherein to indicate the one or more beams used for each repetition of the transmission, the at least one processor is configured to: indicate the one or more beams for each slot of the multiple repetitions.

4. The apparatus of claim 2, wherein to indicate the one or more beams used for each repetition of the transmission, the at least one processor is configured to: indicate the one or more beams in a configuration for the slot aggregation.

5. The apparatus of claim 2, wherein the at least one processor is configured to: indicate the SFN operation based on multiple transmission configuration indicator (TCI) states or multiple tracking reference signals (TRSs), and indicate the non-SFN operation based on a single TCI state or a single TRS.

6. The apparatus of claim 1, wherein at least one of the multiple repetitions is transmitted in a beam different from another repetition in the multiple repetitions.

7. The apparatus of claim 1, wherein the one or more beams used for each repetition of the transmission is indicated to the UE through a transmission configuration indicator (TCI) state.

8. The apparatus of claim 7, wherein the TCI state is transmitted in a downlink control indicator (DCI).

9. The apparatus of claim 1, wherein the multiple repetitions of the transmission includes an initial transmission.

10. The apparatus of claim 1, further comprising a transceiver coupled to the at least one processor.

11. A method of wireless communication at a base station, comprising:
   configuring a user equipment (UE) to receive multiple repetitions of a transmission using a slot aggregation, wherein the multiple repetitions include at least one SFN operation and at least one non-SFN operation;
   indicating, to the UE, one or more beams used for each repetition of the transmission; and
   transmitting the multiple repetitions of the transmission based on the at least one SFN operation, the at least one non-SFN operation, and the one or more beams indicated to the UE, wherein the at least one SFN operation uses more than one beams.

12. The method of claim 11, wherein the at least one non-SFN operation uses a single beam.

13. The method of claim 12, wherein indicating the one or more beams used for each repetition of the transmission comprises: indicating the one or more beams for each slot of the multiple repetitions.

14. The method of claim 12, wherein indicating the one or more beams used for each repetition of the transmission comprises: indicating the one or more beams in a configuration for the slot aggregation.

15. The method of claim 12, further comprising: indicating the SFN operation based on multiple transmission configuration indicator (TCI) states or multiple tracking reference signals (TRSs), and indicating the non-SFN operation based on a single TCI state or a single TRS.

16. The method of claim 11, wherein at least one of the multiple repetitions is transmitted in a beam different from another repetition in the multiple repetitions.

17. The method of claim 11, wherein the one or more beams used for each repetition of the transmission is indicated to the UE through a transmission configuration indicator (TCI) state.

18. The method of claim 17, wherein the TCI state is transmitted in a downlink control indicator (DCI).

19. The method of claim 11, wherein the multiple repetitions of the transmission includes an initial transmission.

20. An apparatus for wireless communication at a user equipment (UE), comprising:
   memory; and
   at least one processor coupled to the memory and configured to:
      receive a configuration from a base station for receiving multiple repetitions of a transmission in a slot aggregation, wherein the multiple repetitions include at least one single frequency network (SFN) operation and at least one non-SFN operation;
      receive an indication indicating one or more beams used for the multiple repetitions of the transmission; and
      receive at least a first repetition of the transmission based on the SFN operation and a second repetition of the transmission based on the non-SFN operation.

21. The apparatus of claim 20, wherein the indication indicates the one or more beams used for each repetition of the transmission.

22. The apparatus of claim 21, wherein the at least one processor is further configured to:
   determine whether a repetition within the multiple repetitions is transmitted by the base station based on the SFN operation or based on the non-SFN operation based on a number of beams used by the base station for transmitting the repetition.

23. The apparatus of claim 22, wherein the first repetition is received using more than one beam and the second repetition comprises received using a single beam.

24. The apparatus of claim 20, wherein the at least one processor is further configured to:
   determine, based on the indication, whether a set of repetitions within the multiple repetitions of the transmission are transmitted by the base station based on the SFN operation or the non-SFN operation.

25. The apparatus of claim 24, wherein the indication indicates the one or more beams for the configuration for the slot aggregation, and wherein the at least one processor is further configured to determine whether a repetition within the multiple repetitions is transmitted by the base station based on the SFN operation or based on the non-SFN operation based on a preconfigured or a predefined rule.

26. The apparatus of claim 20, wherein the at least one processor is further configured to:
   receive an explicit indication from the base station indicating whether each repetition is transmitted based on the SFN operation or based on the non-SFN operation.

27. The apparatus of claim 20, wherein the indication includes a TCI code point comprising a first TCI state and a second TCI state.

28. The apparatus of claim 27, wherein to receive at least the first repetition of the transmission based on the SFN operation and the second repetition of the transmission based on the non-SFN operation, the at least one processor is further configured to:
   receive the first repetition using a first beam indicated in the first TCI state and a second beam indicated in the second TCI state,
   receive the second repetition using the second beam indicated in the second TCI state, and
   receive a third repetition using both the first beam indicated in the first TCI.

29. The apparatus of claim 20, further comprising a transceiver coupled to the at least one processor.

30. A method of wireless communication at a user equipment (UE), comprising:
   receiving a configuration from a base station for receiving multiple repetitions of a transmission in a slot aggregation, wherein the multiple repetitions include at least one single frequency network (SFN) operation and at least one non-SFN operation;
   receiving an indication indicating one or more beams used for the multiple repetitions of the transmission; and
   receiving at least a first repetition of the transmission based on the SFN operation and a second repetition of the transmission based on the non-SFN operation.

* * * * *